(12) United States Patent
Burr et al.

(10) Patent No.: US 8,198,597 B2
(45) Date of Patent: Jun. 12, 2012

(54) APPARATUS FOR FINE-DELAY ADJUSTMENTS OF ANALOG SIGNALS IN POSITRON EMITTER TOMOGRAPHY SENSORS

(75) Inventors: Kent Burr, Buffalo Grove, IL (US); Daniel Gagnon, Twinsburg, OH (US); John Jedrzejewski, Niles, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 71 days.

(21) Appl. No.: 12/916,071

(22) Filed: Oct. 29, 2010

(65) Prior Publication Data

US 2012/0104268 A1 May 3, 2012

(51) Int. Cl.
*G01T 1/164* (2006.01)
(52) U.S. Cl. ............... 250/370.09; 250/370.11; 250/371; 250/362; 250/356.2
(58) Field of Classification Search ............... 250/356.2, 250/371
See application file for complete search history.

(56) References Cited

U.S. PATENT DOCUMENTS

| | | | |
|---|---|---|---|
| 3,601,744 A * | 8/1971 | Zandman | 338/183 |
| 6,642,493 B1 * | 11/2003 | Barbosa et al. | 250/207 |
| 7,414,246 B2 * | 8/2008 | Griesmer et al. | 250/363.09 |
| 7,820,975 B2 * | 10/2010 | Laurence et al. | 250/363.09 |
| 2006/0102845 A1 * | 5/2006 | Williams et al. | 250/363.03 |
| 2006/0138315 A1 * | 6/2006 | Williams et al. | 250/252.1 |
| 2007/0152162 A1 * | 7/2007 | Griesmer et al. | 250/363.09 |

FOREIGN PATENT DOCUMENTS

JP      2007-41007      2/2007

\* cited by examiner

*Primary Examiner* — David Porta
*Assistant Examiner* — Djura Malevic
(74) *Attorney, Agent, or Firm* — Oblon, Spivak, McClelland, Maier & Neustadt, L.L.P.

(57) ABSTRACT

A variable delay device is connected to a photosensor of a time-of-flight gamma ray detection system and includes a substrate on which a plurality of conductive pins are affixed. A first terminal connected to a first of the plurality of pins and a second terminal connected to the second of the plurality of pins are also affixed to the substrate. A jumper electrically connects the plurality of pins at a predetermined distance relative to the substrate, and a time delay of the variable delay device is determined based on the electrical path between the first and second terminals formed by the plurality of pins and the jumper.

16 Claims, 10 Drawing Sheets

APPARATUS FOR FINE-DELAY ADJUSTMENTS OF ANALOG SIGNALS IN POSITRON EMITTER TOMOGRAPHY SENSORS

CROSS-REFERENCE TO RELATED APPLICATIONS

None.

FIELD

The embodiments described herein relate generally to variable delay devices for adjustment of the relative delay between analog signals in PET sensors, and a method of calibrating the same.

BACKGROUND

In PET imaging, or positron emitter tomography, a radiopharmaceutical agent is administered, via injection, inhalation and/or ingestion, to a patient. The physical and bio-molecular properties of the agent then concentrate at specific locations in the human body. The actual spatial distribution, intensity of the point and/or region of accumulation, as well as the kinetics of the process from administration and capture to eventual elimination, all have clinical significance. During this process, the positron emitter attached to the radiopharmaceutical agent emits positrons according to the physical properties of the isotope, such as half-life, branching ratio, etc. Each positron interacts with an electron of the object, is annihilated and produces two gamma rays at 511 keV, which travel at substantially 180 degrees apart. The two gamma rays then cause a scintillation event at a scintillation crystal of the PET detector, which detects the gamma rays thereby. By detecting these two gamma rays, and drawing a line between their locations or "line-of-response," the likely location of the original annihilation is determined. While this process only identifies one line of possible interaction, accumulating a large number of these lines, and through a tomographic reconstruction process, the original distribution is estimated with useful accuracy. In addition to the location of the two scintillation events, if accurate timing—within few hundred picoseconds—is available, time-of-flight calculations are also made in order to add more information regarding the likely position of the annihilation event along the line. Limitations in the timing resolution of a scanner determines the accuracy of the positioning along this line. Limitations in the determination of the location of the original scintillation events determines the ultimate spatial resolution of the scanner. A specific characteristic of the isotope (for example, energy of the positron) contributes (via positron range and co-linearity of the two gamma rays) to the determination of the spatial resolution for a specific radiopharmaceutical agent.

The above process is repeated for a large number of annihilation events. While every case needs to be analyzed to determine how many scintillation events are required to support the desired imaging tasks, conventionally a typical 100 cm long, FDG (fluoro-deoxyglucose) study accumulates about 100 millions counts or events. The time required to accumulate this number of counts is determined by the injected dose, as well as the sensitivity and counting capacity of the scanner.

PET imaging relies on the conversion of gamma rays into light through fast and bright scintillation crystals, generating the scintillation events referred to above. Time-of-Flight PET further requires sub-nanosecond timing resolution and resolutions of a few hundred picoseconds is also being contemplated. While it is complicated enough to tune and adjust two channels of scintillating crystal, photomultiplier tubes (PMT) and electronics, this complexity is only increased on a large arrays of crystals and sensors.

Modern PET systems support 500-600 ps timing resolutions. At this level, even small timing variation in the components are significant, and transit time is the most important variable in this equation. Transit time is the average time between when a photon strikes the photocathode of a PMT and when the corresponding current pulse is measured at the anode of the PMT. The variation of this quantity from one PMT to another causes the signals to reach the analysis circuitry at different times.

The need for an accurate transit time of the detection chain is often offset by internal or intrinsic ballistic differences between the crystal location relative to shortest and longest optical paths to the sensor. This is a complex theoretical estimation to perform, but measurements suggests that 25 to 40 ps is inherent timing variation related to optical path. Therefore, 25-40 ps accuracy in balancing the transit time of all the channels of the detector is a reasonable target. Any additional accuracy is useful, but has a marginal—if not negligible—effect on system performance.

Conventionally, several ways exist to control or add time delay to a PMT pulse in gamma ray detectors. Most methods involve active components, which degrade the frequency content of the signal and target unnecessary accuracy to the synchronization of all signals. Other conventional systems do not compensate for transit time variations between different PMT assemblies, and, therefore, suffer from degraded timing resolution. Moreover, the active circuitry approaches in conventional systems are costly, add to the complexity of the circuitry and, more importantly, degrade the quality and integrity of the signal.

BRIEF DESCRIPTION OF THE DRAWINGS

A more complete appreciation of the embodiments described herein, and many of the attendant advantages thereof will be readily obtained as the same becomes better understood by reference to the following detailed description when considered in conjunction with the accompanying drawings, wherein.

DETAILED DESCRIPTION

In general, a variable delay device is connected to a photomultiplier tube, or photosensor, in a time-of-flight gamma ray detection system. The variable delay device includes a substrate and a plurality of conductive pins affixed onto the substrate. The variable delay device also includes a first terminal connected to a first of the plurality of pins and a second terminal connected to a second of the plurality of pins. A jumper that electrically connects the plurality of pins at a predetermined distance relative to the substrate is also included in the variable delay device, where a time delay introduced by the variable delay device is determined by an electrical path between the first and second terminals formed by the plurality of conductive pins and the jumper.

One embodiment for fine timing adjustments provides continuous adjustment, and another embodiment provides discrete adjustment either by physically setting jumpers or by electronically selecting different delay lines. A maximum transit time variation of 400 ps, and a discrete delay line of 10 steps of 40 ps is provided. However, as one of ordinary skill in the art will recognize, other maximum transit time variations and delay steps are possible without departing from the scope of the present advancements.

Figure 1:
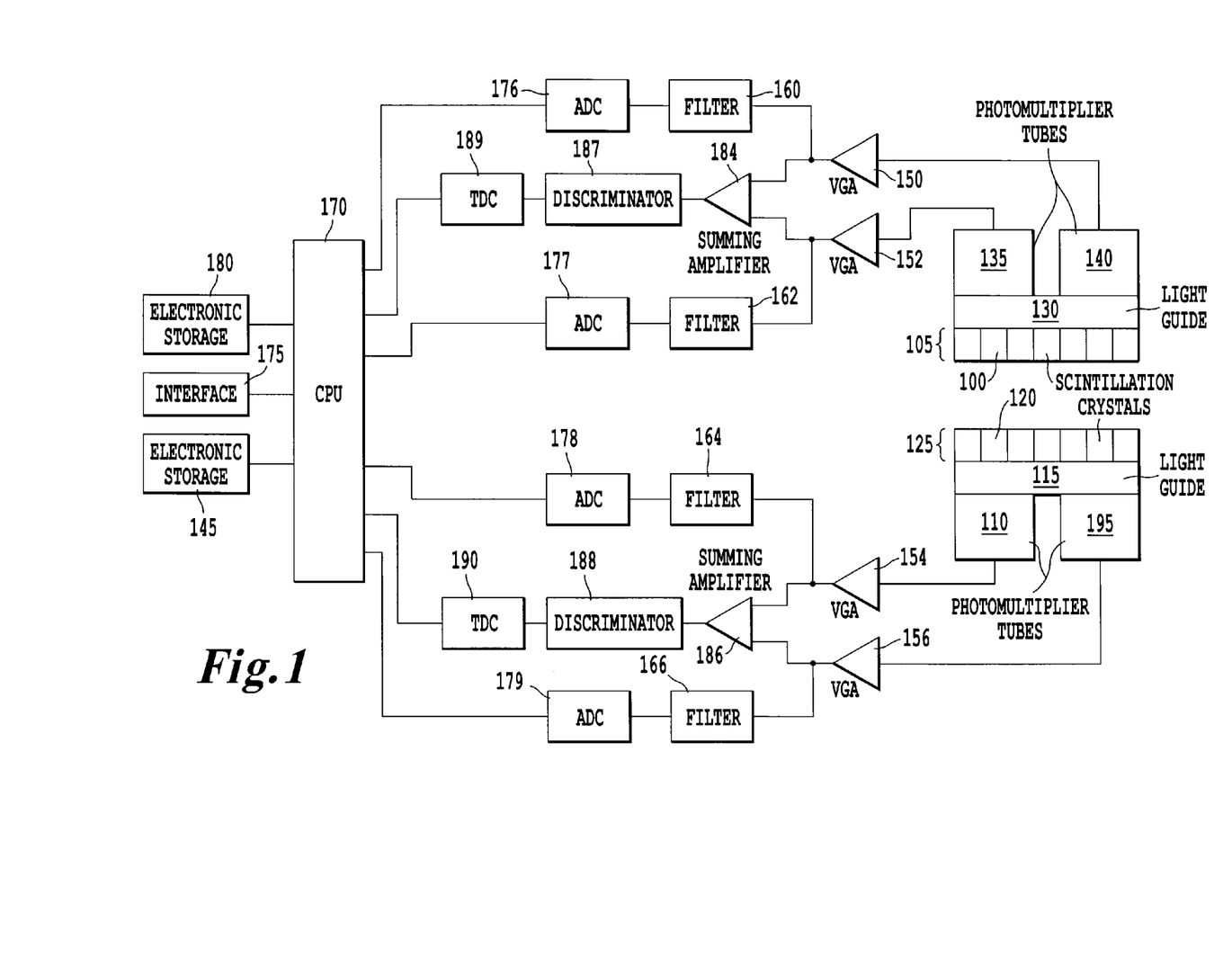
FIG. 1 is a schematic drawing of a gamma ray detection system according to an exemplary embodiment of the present advancements.

Referring now to the drawings, wherein like reference numerals designate identical or corresponding parts throughout the several views, FIG. 1 is a schematic drawing of a gamma ray detection system according to an exemplary embodiment of the present advancements. In FIG. 1, photomultiplier tubes 135 and 140 are arranged over light guide 130, and the array of scintillation crystals 105 is arranged beneath the light guide 130. A second array of scintillation crystals 125 is disposed opposite the scintillation crystals 105 with light guide 115 and photomultiplier tubes 195 and 110 arranged thereover.

In FIG. 1, when gamma rays are emitted from a body under test (not shown), the gamma rays travel in opposite directions, approximately 180° from each other. Gamma ray detection occurs simultaneously at scintillation crystals 100 and 120, and a scintillation event is determined when the gamma rays are detected at scintillation crystals 100 and 120 within a predefined time limit. Thus, the gamma ray timing detection system detects gamma rays simultaneously at scintillation crystals 100 and 120. However, for simplicity only, gamma ray detection is described relative to scintillation crystal 100. One of ordinary skill in the art will recognize, however, that the description given herein with respect to scintillation crystal 100 is equally applicable to gamma ray detection at scintillation crystal 120.

Each photomultiplier tube (PMT) 110, 135, 140 and 195 is respectively connected to variable gain amplifiers (VGA's) 150, 152, 154, and 156. The VGAs act as signal buffers and allow the acquisition system to be adjusted to accommodate variation in PMT gain, such as occurs naturally as part of the PMT manufacturing process and occurs due to aging of the PMTs 110, 135, 140, 195. The signal output from each VGA 150, 152, 154, and 156 is split into two separate electronic paths.

One electronics path is used for measuring the arrival time of the gamma ray. The signal for this path is typically formed by summing two or more signals from the same detector in a summing amplifier 184 and 186. The act of summing multiple signals from the same detector improves the signal to noise ratio for the timing estimate and reduces the number of required electronic components. After summing, the signal is passed to a discriminator 187 and 188. The discriminator 187 or 188, which typically has an adjustable threshold, produces a precisely timed electronic pulse when the summed signal passes the threshold setting. The output of the discriminator 187 or 188 triggers a time-to-digital converter (TDC) 189 and 190. The TDC 189 or 190 produces a digital output which encodes the time of the discriminator pulse relative to a system clock (not shown). For a time-of-flight PET system, the TDC 189 or 190 produces a time stamp with an accuracy of 15 to 25 ps.

For each PMT 110, 135, 140, 195 there is an independent electronics path which is used to measure the amplitude of the signal on each PMT 110, 135, 140, 195. This path consists of a filter 160, 162, 164 and 166 and an analog to digital converter (ADC) 176, 177, 178 and 179. The filter 160, 162, 164 or 166, for example a bandpass filter, is used to optimize the signal to noise ratio of the measurement and performs an anti-aliasing function prior to conversion to a digital signal by the ADC 176, 177, 178 or 179. The ADC 176, 177, 178 or 179 can be a free-running type, running at 100 MHz, for example, in which case the central processing unit (CPU) 170 performs a digital integration, or the ADC 176, 177, 178 or 179 can be a peak-sensing type. The ADC and TDC outputs are provided to a CPU, 170, for processing. The processing consists of estimating an energy and position from the ADC outputs and an arrival time from the TDC output for each event, and may include the application of a many correction steps, based on prior calibrations, to improve the accuracy of the energy, position, and time estimates. As one of ordinary skill in the art would recognize, the CPU 170 can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the CPU 170 may be implemented as a set of computer-readable instructions stored in any of the above-described electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art.

Once processed by the CPU 170, the processed signals are stored in electronic storage 180, and/or displayed on display 145. As one of ordinary skill in the art would recognize, electronic storage 180 may be a hard disk drive, CD-ROM drive, DVD drive, FLASH drive, RAM, ROM or any other electronic storage known in the art. Display 145 may be implemented as an LCD display, CRT display, plasma display, OLED, LED or any other display known in the art. As such, the descriptions of the electronic storage 180 and the display 145 provided herein are merely exemplary and in no way limit the scope of the present advancements.

FIG. 1 also includes an interface 175 through which the gamma ray detection system interfaces with other external devices and/or a user. For example, interface 175 may be a USB interface, PCMCIA interface, Ethernet interface or any other interface known in the art. Interface 175 may also be wired or wireless and may include a keyboard and/or mouse or other human interface devices known in the art for interacting with a user.

Figures 2A, 2B:
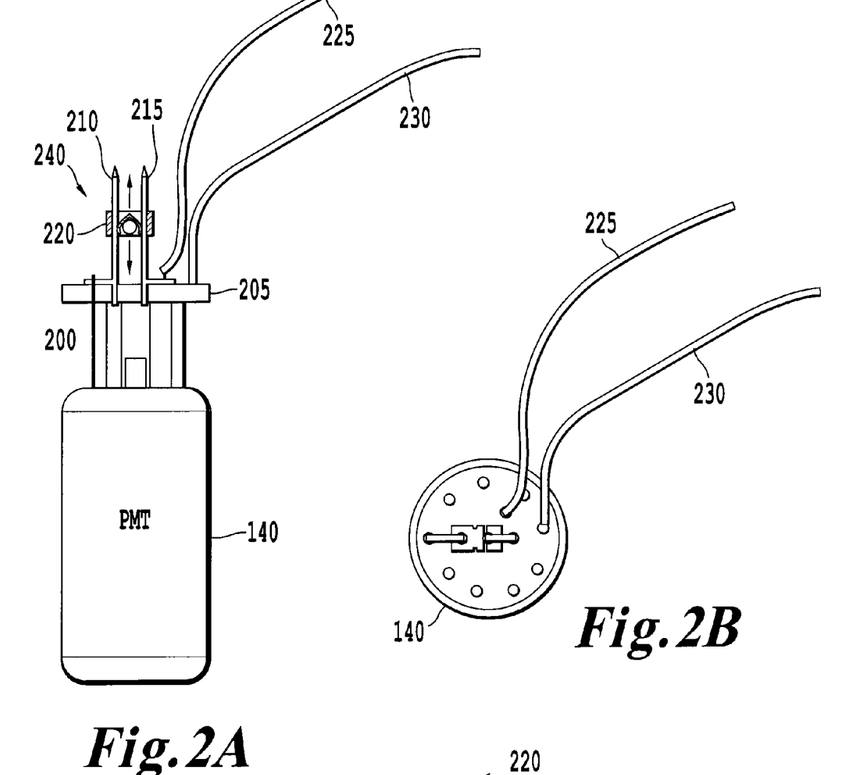
FIG. 2 is a schematic diagram of a light sensor including the variable delay device according to an exemplary embodiment of the present advancements.

FIG. 2 is a schematic drawing of a photomultiplier tube, or light sensor, incorporating a continuous time delay device according to an exemplary embodiment. In FIG. 2, the photomultiplier tube 140 is the same as photomultiplier tube 140 of FIG. 1. Signal leads 200 from the photomultiplier tube 140 are electrically connected to the time delay device 240. The time delay device 240 includes a substrate, or printed circuit board 205, with conductive pins 210, 215 affixed thereto. A jumper 220 electrically connects the pins 210, 215 such that a time delay is introduced which corresponds to the electrical path formed by the pins 210, 215 and the jumper 220. A high voltage cable 230 and signal cable 225 are also connected to the substrate 205. Although not shown in FIG. 2, a voltage divider, or bleeder circuit, connected between the high voltage cable 230 and the photomultiplier tube is be used to step down the voltage provided to the dynodes of the photomultiplier tube 140 to a desired value.

Figure 3:
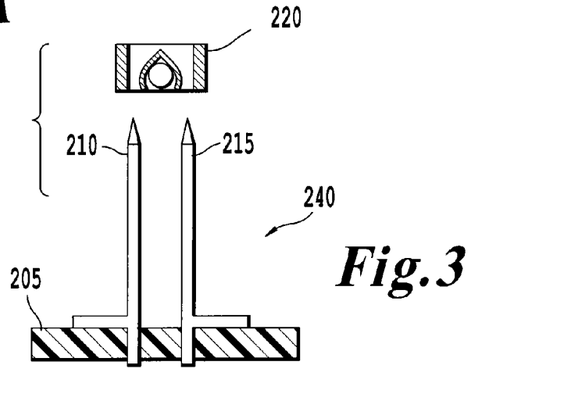
FIG. 3 is a schematic drawing of a continuous variable delay device according to an exemplary embodiment of the present advancements.

FIG. 3 is a schematic drawing of the continuous delay device 240 of FIG. 2. As discussed above, pins 210, 215 are affixed to the circuit board, or substrate, 205 and a jumper 220 is used to interconnect the pins electrically.

Figure 4A:
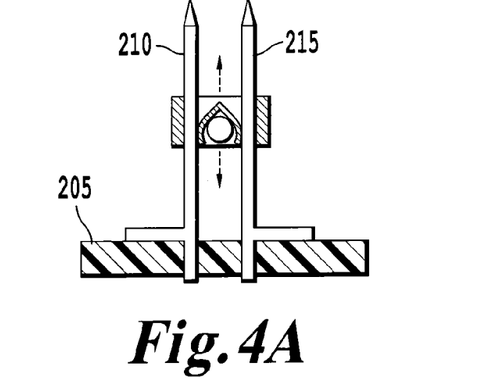
FIG. 4 is a schematic diagram of delay adjustment in the variable delay device according to an exemplary embodiment of the present advancements.

FIG. 4 is a schematic diagram of setting a desired delay in the continuous delay device 140. In FIG. 4A, the jumper 220 is slidably connected to pins 210, 215 in order to electrically connect the pins 210, 215. As shown by the dotted arrows, the jumper 220 slides up and down the pins 210, 215 in order to establish the desired delay.

Figure 4B:
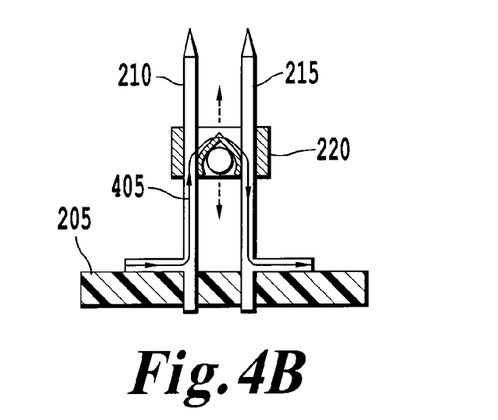
Figure 4C:
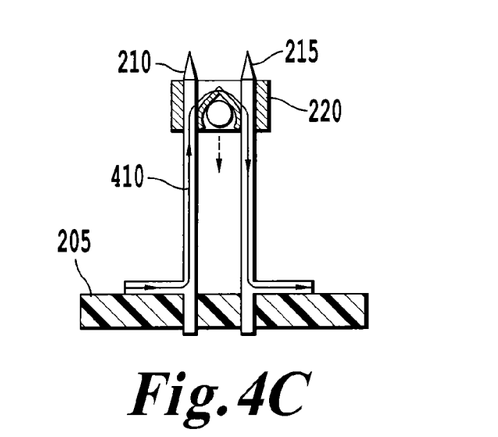

In FIG. 4B, a current path 405 is established by sliding the jumper to a predetermined position on the pins 210, 215. As such, the total delay from the first pin 210 to the second pin 215 is a function of the length of each pin from the substrate 205 to the jumper 220, as well as the length of the jumper 220 itself. As shown in FIG. 4C, the current path 410 is made longer by sliding the jumper 220 further away from the substrate 205 on the pins 210, 215. Thus, the configuration of FIG. 4C introduces a larger delay than the configuration of FIG. 4B. A maximum delay in the continuous delay device 140 occurs when the jumper 220 is at a position on the pins 210, 215 furthest away from the substrate 205.

As can be appreciated by one of ordinary skill in the art, pins 210 and 215 may be made of any electrically conductive material, such as copper, aluminum, and/or gold. Further, the jumper 220 may also be made from any electrically conductive material such as copper, aluminum, and/or gold. Pins 210, 215 may also be of any shape or length. As such, the shape, size and material composition of pins 210, 215 and jumper 220 described herein are merely exemplary and do not in any way limit the scope of the present advancements.

Figure 5A:
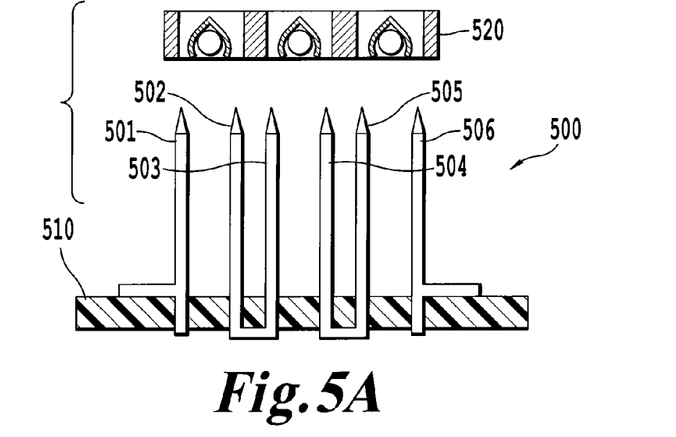
FIG. 5 is a schematic diagram of delay adjustment on another variable delay device according to an exemplary embodiment of the present advancements.
Figure 5B:
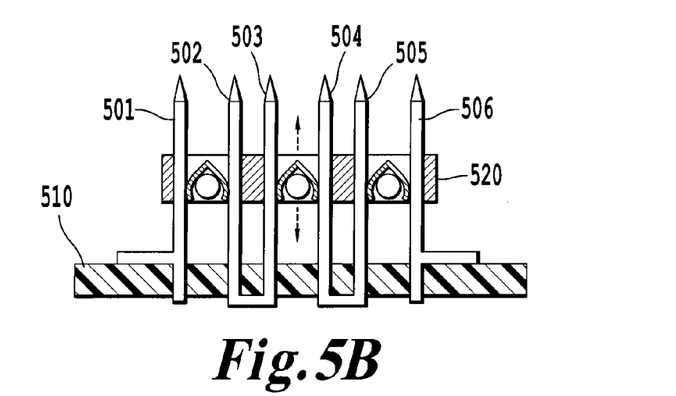
Figure 5C:
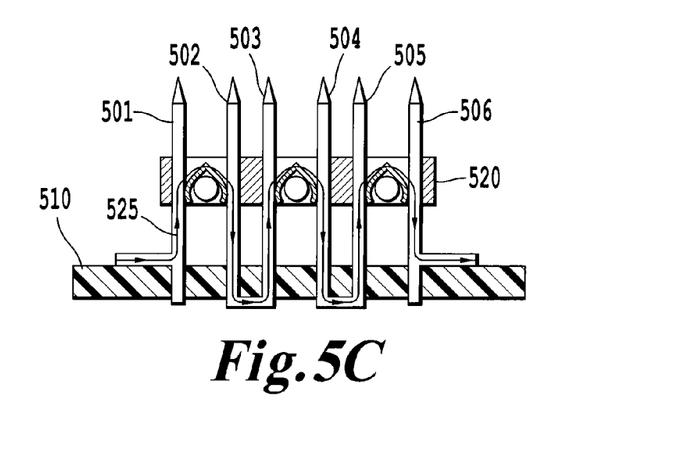

For small delays, the two pin configurations described above with reference to FIGS. 3 and 4 are adequate, but for larger delays the pin lengths may become excessive. Thus, as shown in FIG. 5, a continuous time delay device 500 according to another exemplary embodiment of the present advancements includes multiple pins 501-506 affixed to the substrate 510. As discussed above, the substrate may be a printed circuit board. A jumper 520 includes multiple connection points in order to interconnect pins 501-506 electrically. As shown in FIG. 5B, the jumper 520 is slidably connected to the pins 501-506 to create a current path and corresponding delay. As shown in FIG. 5C, the jumper 520 is set a predetermined distance from the substrate 510 in order to establish a current path 525 consisting of the lengths of each pin 501-506 and the length of the jumper 520 itself.

As one of ordinary skill in the art would recognize, although FIG. 5 shows the continuous time delay device 500 as including six pins 501-506, the continuous time delay device 500 is not limited thereto. More or fewer pins may be added in order to achieve the desired maximum delay. The continuous time delay device 500 of FIG. 5 allows greater delays than the continuous time delay device of FIG. 3 while maintaining the pin lengths relatively short.

Figure 6A:
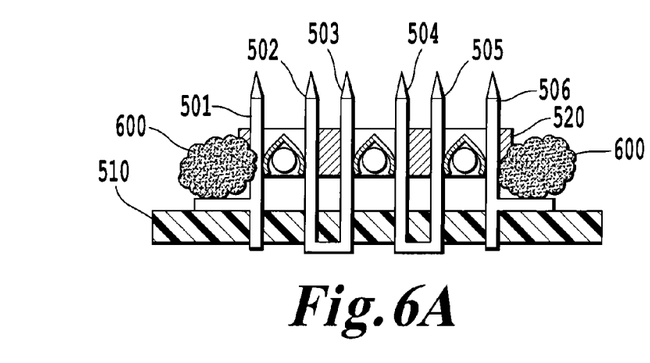
FIG. 6 is a schematic diagram of a time delay device with a fixed delay after adjustment according to an exemplary embodiment of the present advancements.

As shown in FIG. 6, once the continuous time delay device 500 has been adjusted to a desired delay, a fixing agent 600, such as a glue, may be used to hold the jumper 520 in place. Though FIG. 6 illustrates the fixing agent 600 as affixing the jumper 520 to the outermost pints 501 and 506, other configurations are also possible. For example, the fixing agent 600 may affix the jumper 520 to each pin 501-506, or to a single pin or any other possible combination of pins. Further, the jumper 520 may also be soldered to the pins or crimped thereon. As such, FIG. 6 is merely exemplary and one of ordinary skill in the art will recognize that other methods of fastening the jumper 520 to the pins 501-506 are possible without departing from the scope of the present advancements.

Figures 6B, 7:
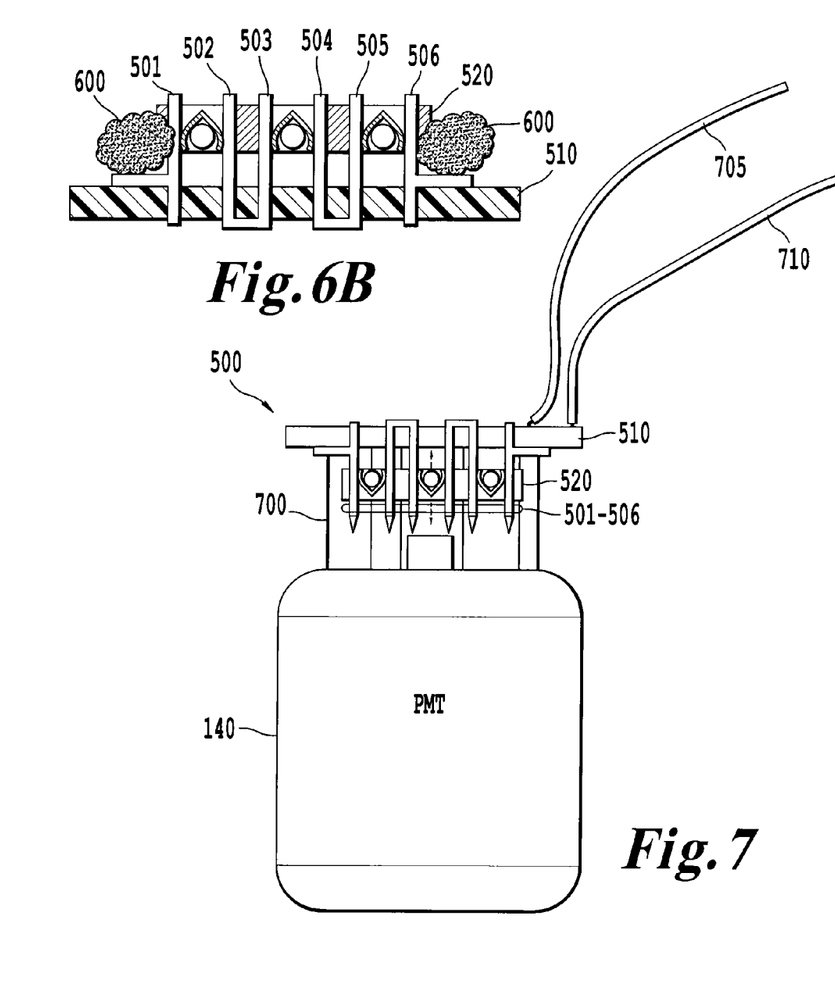
FIG. 7 is a schematic drawing of another light sensor configuration including a variable delay device according to an exemplary embodiment of the present advancements.

FIG. 7 is a schematic diagram of another configuration of the photomultiplier tube 140, or light sensor, in which the continuous delay device 500 is connected to the photomultiplier tube 140 via signal leads 700. The pins 501-506 of the continuous delay device 500 face the photo multiplier tube 140 in FIG. 7, with the jumper 520 therebetween. However, as one of ordinary skill in the art would recognize, such a configuration is merely exemplary and does not limit the present advancements. For example, the continuous delay device 500 may be positioned such that the pins 501-506 face away from the photomultiplier tube 140. FIG. 7 also illustrates signal cable 705 connected to the continuous delay device 500, and high voltage cable 710 connected to the substrate 510, which may include a voltage divider as discussed above.

Figures 8, 10:
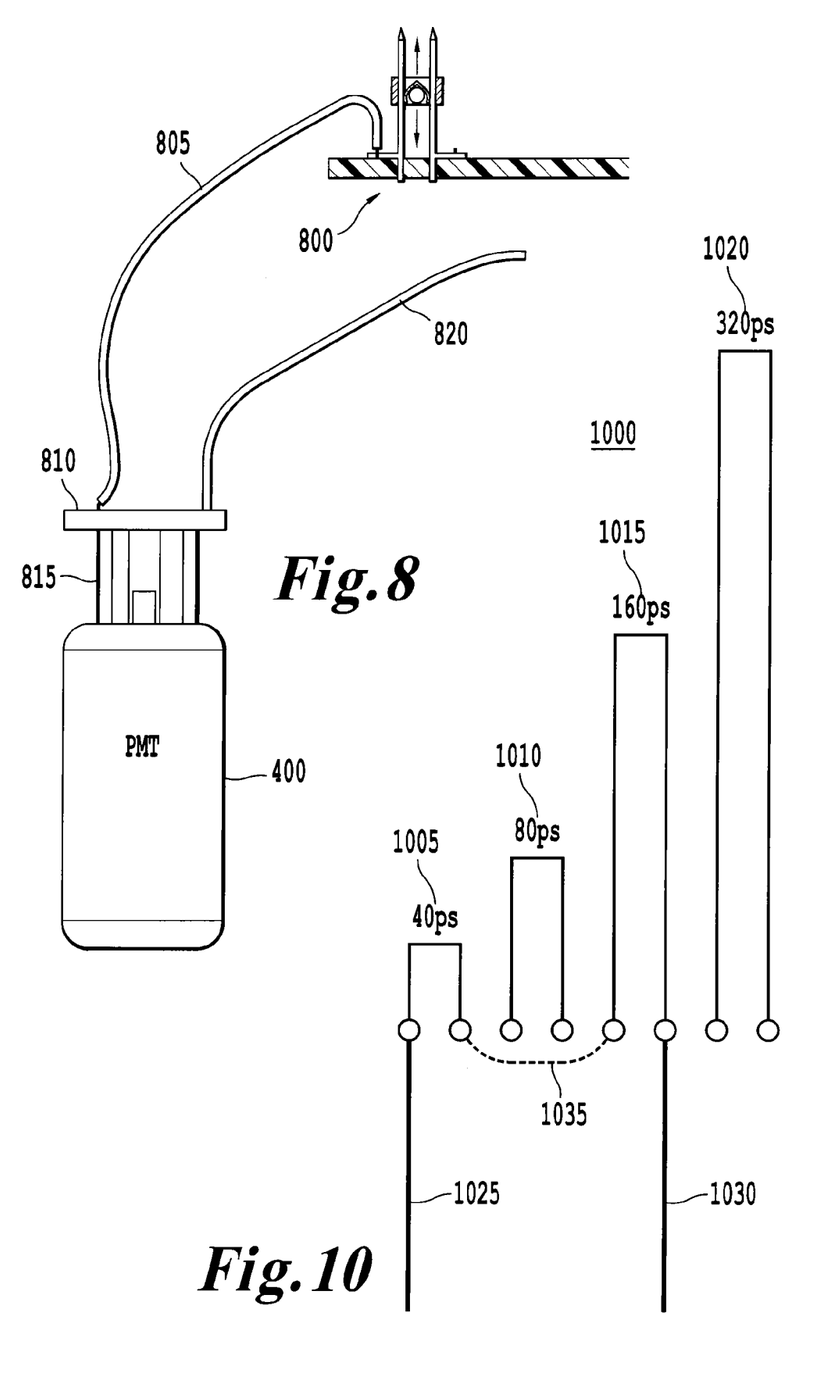
FIG. 8 is a schematic drawing of a further configuration of a light sensor including the time delay device according to an exemplary embodiment of the present advancements.
FIG. 10 is a schematic drawing of another discrete time delay device according to an exemplary embodiment of the present advancements.

Further, FIG. 8 is a schematic diagram of another configuration of the continuous delay device 240. In FIG. 8, the continuous delay device 240 is affixed to a printed circuit board 800 which is located separate from the photomultiplier tube 140. The signal cable 805 interconnects a second printed circuit board 810 to the continuous delay device on the circuit board 800. The signal leads 815 connect the photomultiplier tube 140 to the printed circuit board 810. High voltage cable 820 is also connected to the printed circuit board 810, which includes a voltage divider, as explained above.

As one of ordinary skill in the art would recognize, though a two-pin continuous delay device is illustrated in FIG. 8, such an embodiment is not limited thereto. Indeed, a continuous delay device incorporating any number of pins, and corresponding jumper, may be used without departing from the scope of the present advancements.

Figure 9:
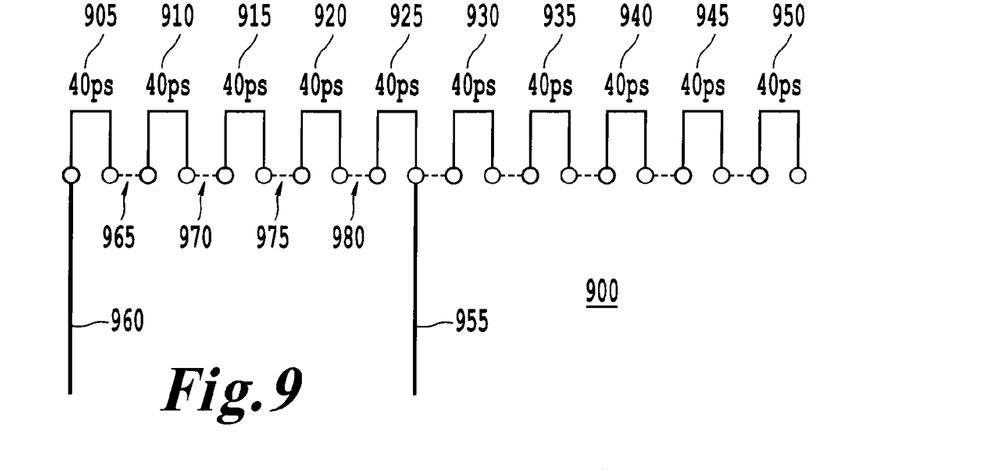
FIG. 9 is a discrete time delay device according to another exemplary embodiment of the present advancements.

In another embodiment of the present advancements, a delay device having discrete, preset delay elements is described. In FIG. 9, a discrete delay device 900 is illustrated. In FIG. 9, preset delay elements 905-950 each provide a 40 picosecond delay. As one of ordinary skill in the art would recognize, however, delay elements 905-950 may provide larger or smaller delays than 40 picoseconds without departing from the scope of the present invention. Similarly, though 10 discrete elements 905-950 are shown in FIG. 9, one of ordinary skill in the art would recognize that the present advancements may be used with any number of discrete delay elements.

In FIG. 9, a first lead 960 is connected to one of the delay elements 905, and a second lead 955 is connected to a second of the delay elements 925. Additional jumpers 965-980 interconnect all delay elements between delay element 905 and delay element 925 in order to form a current path whose length is the sum of the lengths of the delay elements 905-925 as well as jumpers 965-980, and the total delay is given by this current path length.

Although FIG. 9 illustrates that each delay element 905-950 has a fixed delay of the same length, the present advancements also include a discrete time delay device having discrete delays, which differ in length. In FIG. 10, a time delay device 1000 includes four discrete delays 1005, 1010, 1015 and 1020, each with a different delay. For example, delays of 40 picoseconds, 80 picoseconds, 160 picoseconds and 320 picoseconds are shown. As one of ordinary skill in the art would recognize, other delay values are possible without departing from the scope of the present advancements.

In FIG. 10, a first lead 1025 is connected to the delay element 1005 and a second lead 1030 is connected to the delay element 1015. A jumper 1035 interconnects delay elements 1005 and 1015, but not delay element 1010. As such, the combined delay provided by the discrete delay device 1000 in FIG. 10 is determined by the length of the delay element 1005, the length of the delay element 1015 and the length of the jumper 1030. Further, though not shown in FIG. 10, additional jumpers may be used to configure different delays. Thus, a discrete delay device 1000 including multiple discrete delay elements 1005-1020, each with a different preset delay, may be used to implement a wide range of delay values.

Figure 11:
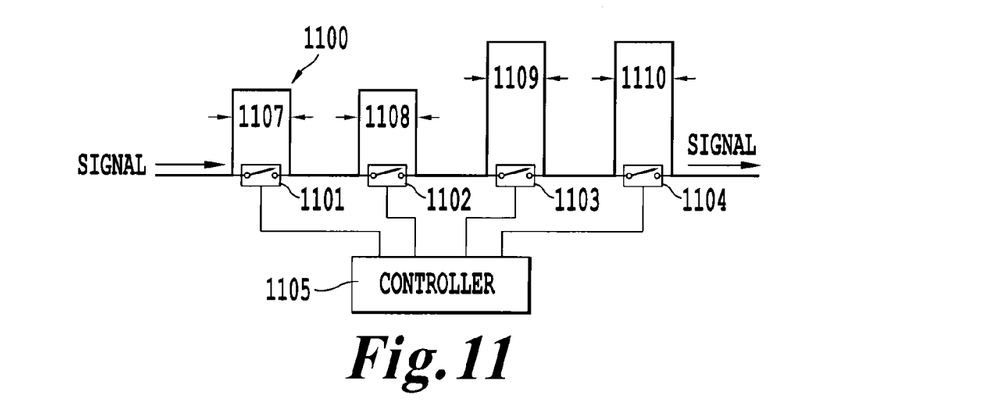
FIG. 11 is a schematic drawing of a computer-controlled discrete time delay device according to an exemplary embodiment of the present advancements.

Further, setting the desired delay in the delay device 1000 may be performed manually or by computer control. As shown in FIG. 11, an additional exemplary embodiment, which sets the delay under computer control, replaces the jumpers in 900 and/or 1000 with electronically controlled switches 1101, 1102, 1103, 1104, which are connected to a controller 1105. The delay of the delay device 1000 is then set by the controller 1105 by closing none, some or all of the switches 1101, 1102, 1103, 1104. Each switch 1101, 1102, 1103, 1104 is positioned to bypass part of an impedance controlled conductive trace, which is made out of copper, for example. Therefore, the effective transit length of a PMT signal path in the impedance controlled conductive trace can be incrementally adjusted by selectively enabling electronic switches (1101, 1102, 1103, 1104) to re-direct the signal past a longer route 1107, 1108, 1109, 1110 of conductor. A number of longer routes 1107, 1108, 1109, 1110, each having a different length, can be arranged along the impedance controlled conductive trace 1100 to allow for a wide range of adjustment, based on the activated switches 1101, 1102, 1103, 1104. The effective transit time in each long route 1107, 1108, 1109, 1110 is defined as a predetermined minimal value representing the granularity of the adjustment. The effective shorted stub length of each bypassed longer route 1107, 1108, 1109, 1110 is chosen to minimize the detrimental effects of the shorted stub to the portion of the signal with the highest importance.

Though FIG. 11 includes four longer routes 1107, 1108, 1109, 1110, any number of longer routes may be included without departing from the present advancements. The switches 1101, 1102, 1103, 1104 may also be either normally open or normally closed switches and the controller may use either positive or negative logic to control the switches. As such, FIG. 11 is merely exemplary and does not limit the present advancements.

Figure 12:
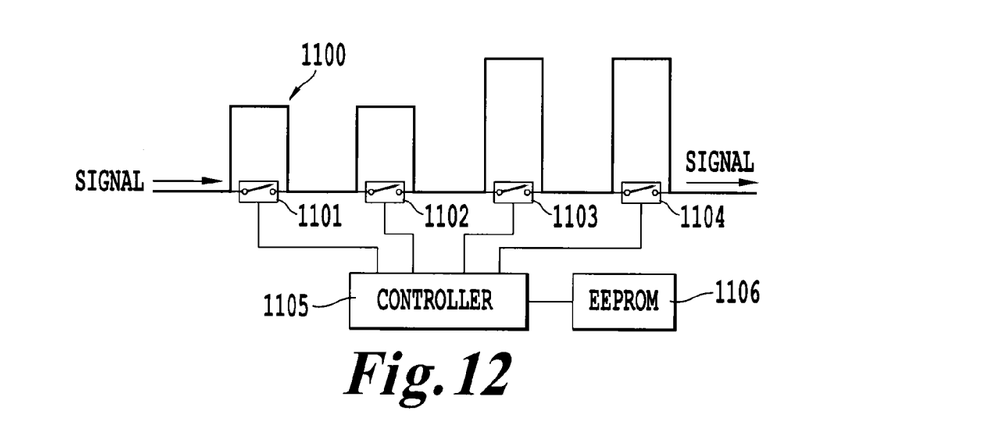
FIG. 12 is a schematic drawing of another computer-controlled discrete time delay device according to an exemplary embodiment of the present advancements.

Further, as shown in FIG. 12, a non-volatile memory, such as an EEPROM 1106 may be connected to the controller 1105 to store the switch settings. The controller 1105 can then rewrite the switch settings in the EEPROM 1106 in the event of component changes or other system changes that impact the signals delays. As can be appreciated, other non-volatile memories such as FLASH memory, EPROM, PROM and battery back-up RAM may also be used without departing from the scope of the present advancements. The non-volatile memory may also be incorporated into the controller 1105 or may be a separate device as shown in FIG. 12.

Next, a method of calibrating the delay devices will be described. The method described below applies to calibration of both continuous and discrete delay devices. The delay devices 240, 500 and/or 1000 can be incorporated into an electronics board, such as one that also contains a voltage divider to supply the correct voltages to each of the stages of the PMT, on the PMT or into an electronics board in the detector or in the PET system. If the adjustment mechanism is incorporated independently on each PMT, then the fine delay can be set using a pulsed laser, coincident gamma ray sources and scintillator crystals.

Figure 13:
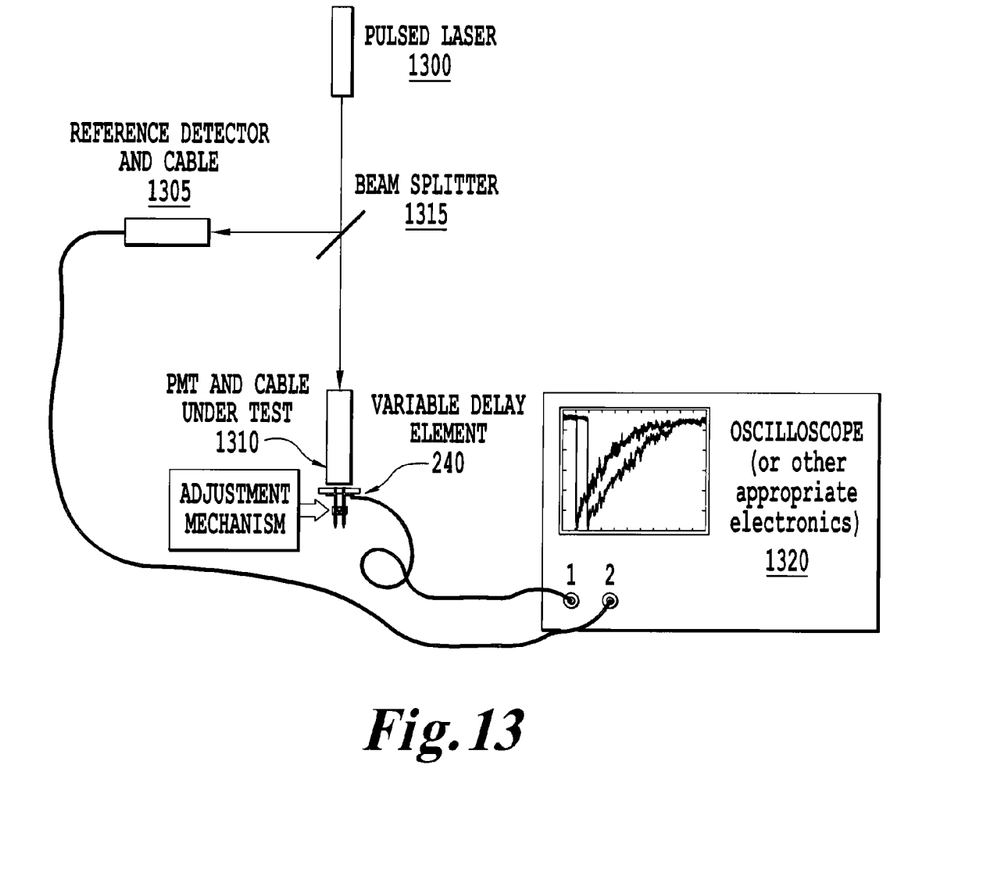
FIG. 13 is a schematic drawing of a calibration circuit for the time delay device according to exemplary embodiments of the present advancements.

In one method, the output of a pulsed laser 1300 is split by a beam splitter 1315 and sent to two detectors 1305, 1310 as shown in FIG. 13. The laser 1300 typically produces picosecond pulses, but femtosecond or nanosecond pulses lasers can also be used without departing from the scope of the present advancements. One detector 1305 and cable combination is the "reference detector." All devices to be adjusted are calibrated against the same reference detector 1305, and fixtures (not shown) are used to assure that both detectors 1305, 1310 are always placed in the same locations. The output of the reference detector 1105 and the detector-under-test 1310 are both sent to an oscilloscope 1320 or other appropriate electronic measurement device. The variable delay device 240, 500 or 1000 is then adjusted to produce the desired relative delay between the pulse from the reference detector 1305 and the pulse from the detector-under-test 1310.

Figure 14:
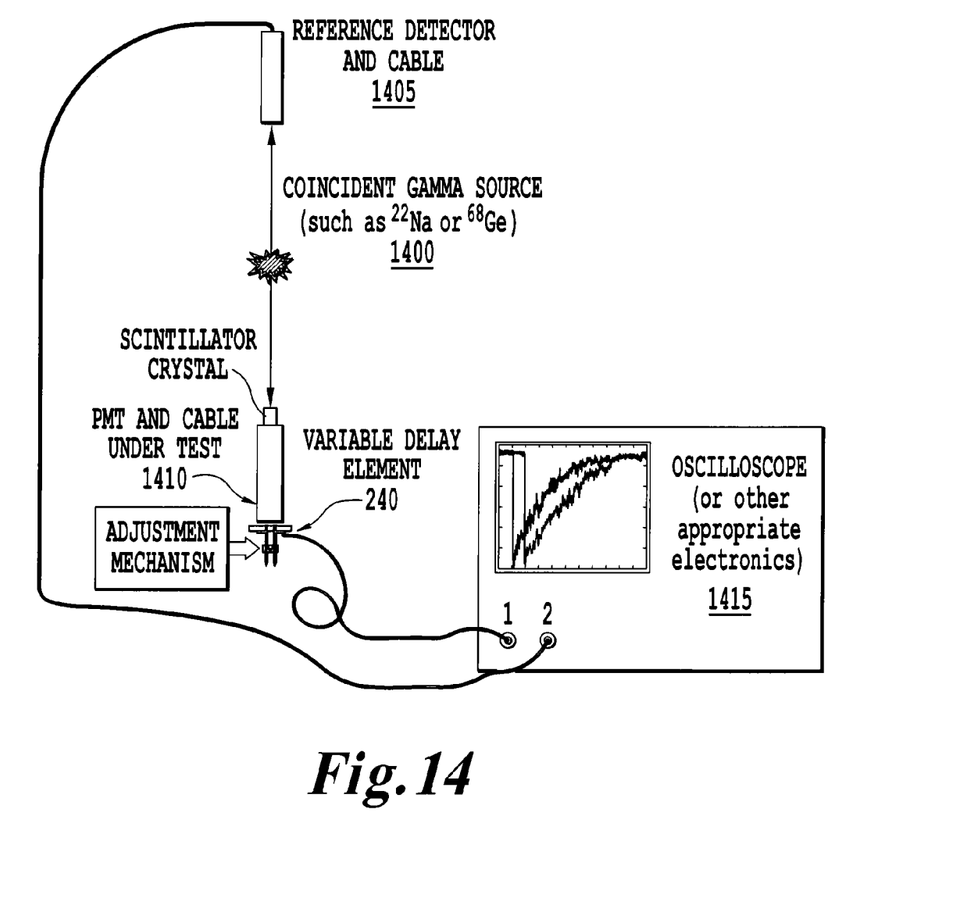
FIG. 14 is a schematic diagram of another calibration circuit for the time delay device according to exemplary embodiments of the present advancements.

In another method shown in FIG. 14, scintillator crystals are coupled to the reference detector 1405 and the detector-under-test 1410. Both detectors 1405, 1410 are placed on opposite sides of a source 1400 of coincident gamma rays (such as 511 keV annihilation photons from 22Na or 68Ge). All devices to be adjusted are calibrated against the same reference detector 1405, and fixtures (not shown) are used to assure that both detectors are always placed in the same locations. The output of the reference detector 1405 and the detector-under-test 1410 are both sent to an oscilloscope 1415 or other appropriate electronic measurement device. The variable delay element is then adjusted to produce the desired relative delay between the pulse from the reference detector and the pulse from the detector-under-test.

In either method described above, delay adjustment can be performed manually or by computer control. For manual adjustment, the position of the slidable element in the continuously variable delay device could be set by hand or by manual travel stage with a micrometer connected to the slidable element, or in the discretely adjustable delay device the jumper position could be set by hand. For computer-controlled adjustment, the slidable element in the continuously variable delay device could be set by computer-controlled travel stage using a stepper motor, or the computer could select the settings of the electronic switches in the embodiment with electronically controlled switching elements. The advantage of these methods is that they are performed during PMT manufacture. The laser method, in particular, requires a short setup and measurement time, resulting in low overall cost. Alternatively, the desired delay for each PMT/cable can be set after the PMTs have been incorporated into detectors if the adjustment mechanism is incorporated independently on each PMT or if the adjustment mechanism is incorporated onto one or more separate electronics boards. As one of ordinary skill in the art would recognize, the above-described adjustment methods are equally applicable to discrete delay devices such as device 1000, and two-pin or multi-pin continuous delay devices, such as devices 240 and 500.

Figure 15:
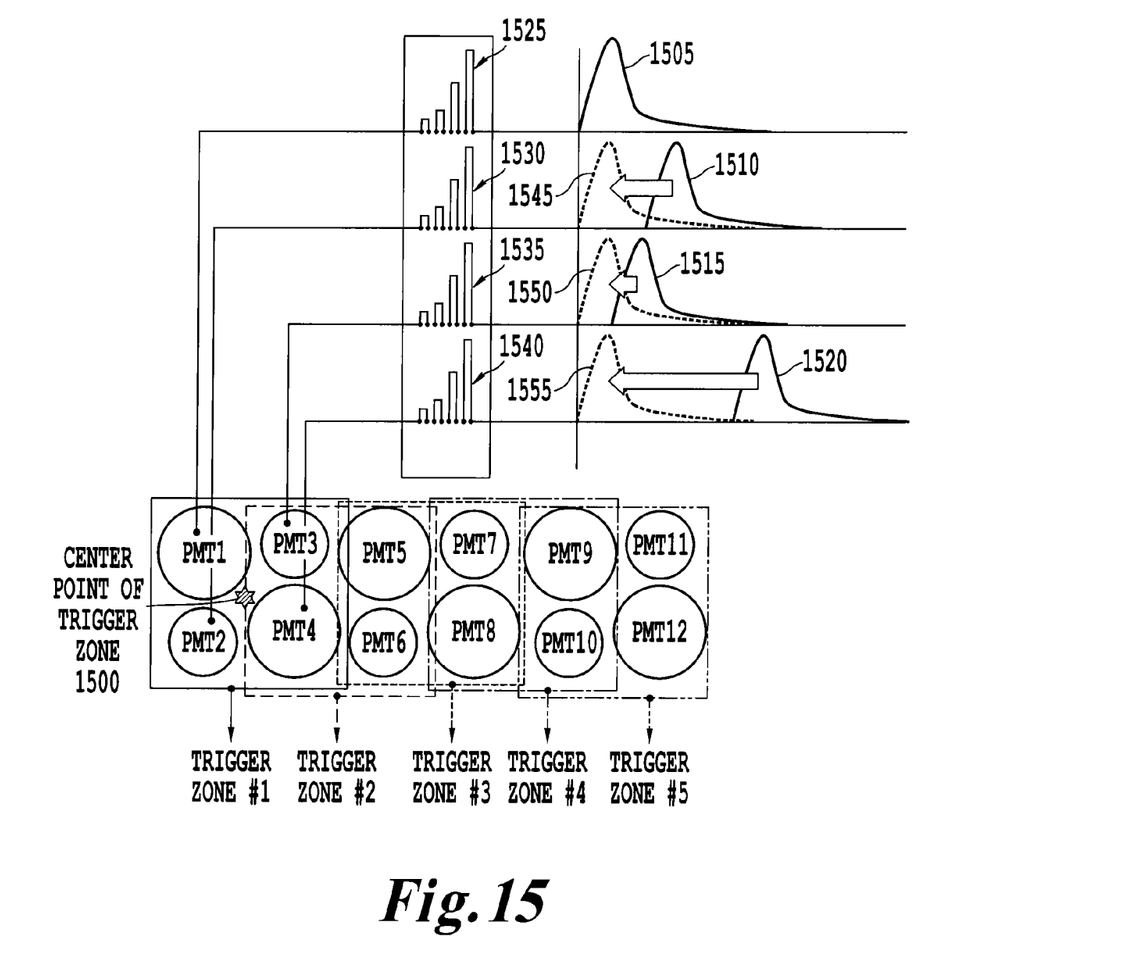
FIG. 15 is a schematic diagram of a calibration of the time delay device according to exemplary embodiments of the present advancements.

When adjustment is performed after detector assembly, prior to calibration, all PMTs are connected to the delay board 1400 as shown in FIG. 15. The delay board 1600 is connected to the front-end analog circuitry of the scanner (not shown) and an oscilloscope. Though a 4-channel oscilloscope is shown in FIG. 15, one of ordinary skill in the art will appreciate that oscilloscopes with more than four channels or fewer than four channels can be used. As such, the number of oscilloscope channels in FIG. 15 is merely exemplary. All jumpers on the delay board 1600 are set to a default position.

A source is placed so that gamma rays are incident at the central point of the first trigger zone 1500 (to balance optical ballistic delay). The collimation of the gamma rays to a region near the center of the trigger zone is accomplished by physical collimation (with a lead or tungsten collimator, for example) or by electronic collimation (with a properly aligned reference detector to trigger the acquisition of the signals from the detector under test), or by using the position-detection capability of the detector to select events incident only on the center of the detector. Next, each PMT 1-4, all from the first trigger zone of the detector, is connected to the delay chain board 1600. The light pulse from each PMT is visualized as pulses 1505-1520 on, for example, an oscilloscope (not shown), and delay devices 1525-1540 are adjusted until pulses 1505 and 1545-1555 align to the same time delay t1. Then the process repeats for each remaining trigger zone 2-5.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A variable delay device connected to a photosensor of a time-of-flight gamma ray detection system, the variable delay device comprising:
    a substrate attached to the photosensor;
    a plurality of conductive pins affixed onto the substrate;
    a first terminal connected to a first of the plurality of pins;
    a second terminal connected to a second of the plurality of pins;
    a jumper configured to electrically interconnect the plurality of pins at a predetermined distance relative to the substrate, a time delay introduced by the variable delay device being determined by an electrical path between the first and second terminals formed by the plurality of pins interconnected with the jumper.

2. The variable delay device according to claim 1, further comprising:
    a fixing agent configured to affix the jumper to the plurality of pins at the predetermined location.

3. The variable delay device according to claim 1, wherein the time delay introduced ranges from 0 ps to 400 ps.

4. The variable delay device according to claim 1, wherein a maximum delay is determined by an overall length of the plurality of conductive pins.

5. The variable delay device according to claim 4, wherein the variable delay device is connected in series with a terminal of the photosensor.

6. The variable delay device according to claim 1, wherein the photosensor is a photomultiplier tube.

7. The variable delay device according to claim 1, wherein the photosensor is a silicon photomultiplier.

8. A variable delay device connected to a photosensor of a time-of-flight gamma ray detection system, the variable delay device comprising:
    a plurality of predetermined delay elements mounted on a substrate that is attached to the photosensor, each configured to introduce a fixed time delay according to a length thereof; and
    at least one jumper configured to interconnect at least two of the plurality of delay elements, a total delay of the variable delay device being determined by a total current path length formed by the jumper and the at least two of the plurality of delay elements.

9. A method of adjusting a time delay device to produce a time delay in a time-of-flight gamma ray detection system, comprising:
    irradiating a scintillator with coincident gamma rays;
    detecting a scintillation event with a reference detector;
    detecting the scintillation event at a plurality of photosensors;
    measuring an arrival time at each of the plurality of photosensors, each arrival time corresponding to a time of detection of the scintillation event at the corresponding photosensors;
    adjusting a jumper of the time delay device relative to a plurality of pins thereon based on the measured arrival times.

10. The method according claim 9, wherein a source of the coincident gamma rays is a 22Na or 68Ge radioactive source.

11. The method according to claim 9, wherein the adjusting step is performed manually.

12. The method according to claim 9, wherein the adjusting step is performed by translating the jumper on the plurality of pins using a micrometer.

13. The method according to claim 9, wherein the adjusting step is performed using a stepper motor under computer control.

14. The method according to claim 8, wherein the photosensor is a photomultiplier tube.

15. The method according to claim 8, wherein the photosensor is a silicon photomultiplier.

16. A positron emission tomography system including a plurality of gamma ray detectors, each of the plurality of gamma ray detectors comprising:

a plurality of scintillation crystals arranged in an array;

a plurality of photosensors arranged in an array adjacent to the scintillation crystals; and a plurality of variable delay devices each corresponding to a respective one of the plurality of photosensors, each variable delay device including a substrate;

a plurality of conductive pins affixed onto the substrate;

a first terminal connected to a first of the plurality of pins;

a second terminal connected to a second of the plurality of pins;

a jumper configured to electrically interconnect the plurality of pins at a predetermined distance relative to the substrate, a time delay introduced by the variable delay device being determined by an electrical path between the first and second terminals formed by the plurality of pins interconnected with the jumper.

* * * * *